United States Patent
Fu et al.

(10) Patent No.: US 11,134,088 B2
(45) Date of Patent: Sep. 28, 2021

(54) SECURE NEXT-HOP COMMUNICATION

(71) Applicant: Telefonaktiebolaget LM Ericsson (publ), Stockholm (SE)

(72) Inventors: Zhang Fu, Stockholm (SE); Anders E Eriksson, Kista (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 16/768,080

(22) PCT Filed: Dec. 14, 2017

(86) PCT No.: PCT/SE2017/051274
§ 371 (c)(1),
(2) Date: May 29, 2020

(87) PCT Pub. No.: WO2019/117772
PCT Pub. Date: Jun. 20, 2019

(65) Prior Publication Data
US 2020/0314111 A1    Oct. 1, 2020

(51) Int. Cl.
*H04L 29/06*    (2006.01)
*H04L 9/08*    (2006.01)
*H04L 9/32*    (2006.01)

(52) U.S. Cl.
CPC ............ *H04L 63/123* (2013.01); *H04L 9/083* (2013.01); *H04L 9/0827* (2013.01);
(Continued)

(58) Field of Classification Search
None
See application file for complete search history.

(56) References Cited

U.S. PATENT DOCUMENTS

| 6,799,270 B1 | 9/2004 | Bull et al. |
| 8,645,680 B2* | 2/2014 | Blom ............... H04L 63/06 713/153 |

(Continued)

FOREIGN PATENT DOCUMENTS

| EP | 2966834 A1 | 1/2016 |
| EP | 3163791 A1 | 3/2017 |

OTHER PUBLICATIONS

International Search Report and Written Opinion for International Application No. PCT/SE2017/051274, dated Sep. 28, 2018, 10 pages.

(Continued)

*Primary Examiner* — Andrew J Steinle
(74) *Attorney, Agent, or Firm* — Nicholson De Vos Webster & Elliott LLP

(57) ABSTRACT

A method of a communication device of requesting data of a destination network node via at least one intermediate node in a service chain. The method comprises acquiring a secret session key configured to subsequently verify authenticity of the requested data and first seed data to be used by the at least one intermediate node and the destination node to generate the session key, transmitting the data request, an indication of the service chain to be traversed, and the first seed data to a next-hop node in the service chain, receiving, in response to the forwarded data request, the requested data having been provided with an indication of authenticity by the next-hop node, and verifying the authenticity of the received data using the acquired session key, wherein the received requested data is considered authenticated.

26 Claims, 7 Drawing Sheets

(52) U.S. Cl.
CPC .......... *H04L 9/0869* (2013.01); *H04L 9/3242* (2013.01); *H04L 2209/38* (2013.01)

(56) References Cited

U.S. PATENT DOCUMENTS

| | | | | |
|---|---|---|---|---|
| 2005/0063544 | A1* | 3/2005 | Uusitalo | H04L 63/306 380/277 |
| 2015/0288704 | A1* | 10/2015 | Huang | H04L 9/3236 726/4 |
| 2018/0337782 | A1* | 11/2018 | Wu | H04L 9/0836 |

OTHER PUBLICATIONS

Xylomenos et al., "A Survey of Information-Centric Networking Research," 2014, pp. 1024-1049, Communications Surveys and Tutorials, vol. 16, No. 2.

Liu et al., "Demonstration of a Functional Chaining System Enabled by Named-Data Networking," ICN'16, Sep. 26-28, 2016, pp. 227-228, Kyoto, Japan.

Sevilla et al., "iDNS: Enabling Information Centric Networking Through the DNS," 2014 IEEE INFOCOM Workshops: 2014 IEEE INFOCOM Workshop on Name-Oriented Mobility, pp. 476-481.

Quinn et al., "Problem Statement for Service Function Chaining," Apr. 2015, 13 pages, Internet Engineering Task Force (IETF), Request for Comments: 7498, IETF Trust and the persons identified as the document authors.

Halpern et al., "Service Function Chaining (SFC) Architecture," Oct. 2015, 32 pages, Internet Engineering Task Force (IETF), Request for Comments: 7665, IETF Trust and the persons identified as the document authors.

Kutscher et al., "Information-Centric Networking (ICN) Research Challenges," Jul. 2016, 38 pages, Internet Research Task Force (IRTF), Request for Comments: 7927, IETF Trust and the persons identified as the document authors.

Bahrami et al., "Secure Function Chaining Enabled by Information-Centric Networking", 2017 International Conference on Computing, Networking and Communications (ICNC): Internet Services and Applications, IEEE, 2017, 7 pages.

Chen et al., "Exploiting ICN for Efficient Content Dissemination in CDNs", 2016 Fourth IEEE Workshop on Hot Topics in Web Systems and Technologies, IEEE, 2016, pp. 14-19.

FG IMT-2020, "TR: Application of Information Centric Networking to IMT-2020", TD 76 (GEN/13), Study Group 13, International Telecommunication Union, Feb. 2017, pp. 1-37.

Supplementary European Search Report and Search Opinion, EP App. No. 17935001.2, dated Jun. 2, 2021, 10 pages.

* cited by examiner

SECURE NEXT-HOP COMMUNICATION

CROSS-REFERENCE TO RELATED APPLICATIONS

This application is a National stage of International Application No. PCT/SE2017/051274, filed Dec. 14, 2017, which is hereby incorporated by reference.

TECHNICAL FIELD

The invention relates to methods of requesting and delivering data over a service chain, and devices performing the methods.

BACKGROUND

Existing service chaining technology is being developed and standardized in the Internet Engineering Task Force (IETF) with a framework for processing of data packets by means of a Service Function Chain. In service chaining, a traffic flow is passed over a chain of connected network services providing a desired set of services to the flow. Examples of a Service Function are a firewall or a network address translator, or processing of payload data such as translations between different video coding formats. Service Functions can be combined into a Service Function Chain in a flexible fashion, for example a firewall followed by Network Address Translation (NAT).

Over recent years, Information Centric Networking (ICN) is gaining momentum as a future technology for 5th generation mobile networks ("5G") and other coming technologies for media distribution, device software upgrades and the Internet of Things (IoT).

Content Centric Networking and Named Data Networking (NDN) represent two approaches within the ICN paradigm. In the following, the term ICN will be used to encompass ICN, CCN and NDN technology.

ICN may be utilized for delivery of content to a wireless communications device, commonly referred to as a User Equipment (UE), over e.g. a 3rd Generation Partnership Project (3GPP) network, where the UE may be embodied in the form of a smart phone, tablet, laptop, a gaming console, etc., or a so called fixed wireless terminal (FWT) in the form of e.g. a television set, a computer, or a set top box, typically being wirelessly connected via WiFi.

In contrast to traditional Internet Protocols (IPs), ICN addresses content objects using globally or locally unique names instead of IP addresses. Hence, every content object in ICN has a globally or locally unique name and is routed through a communication system by means of the unique name instead of IP addresses. The ICN architecture is well suited for service chaining.

However, in any service chaining architecture, a problem is to ensure that data received by the client has been adequately processed by the service chain, and not altered or generated by an attacker.

SUMMARY

An objective of the present invention is to solve, or at least mitigate, this problem in the art and to provide an improved method of requesting and delivering data over a service chain.

This object is attained in a first aspect of the invention by a method of a communication device of requesting data of a destination network node via at least one intermediate node in a service chain. The method comprises acquiring a secret session key configured to subsequently verify authenticity of the requested data and first seed data to be used by the at least one intermediate node and the destination node to generate the session key, transmitting the data request, an indication of the service chain to be traversed, and the first seed data to a next-hop node in the service chain, receiving, in response to the forwarded data request, the requested data having been provided with an indication of authenticity by the next-hop node, and verifying the authenticity of the received data using the acquired session key, wherein the received requested data is considered authenticated.

This object is attained in a second aspect of the invention by a communication device configured to request data of a destination network node via at least one intermediate node in a service chain, the communication device comprising a processing unit and a memory, said memory containing instructions executable by said processing unit, whereby the communication device is operative to acquire a secret session key configured to subsequently verify authenticity of the requested data and first seed data to be used by the at least one intermediate node and the destination node to generate the session key, transmit the data request, an indication of the service chain to be traversed, and the first seed data to a next-hop node in the service chain, receive, in response to the forwarded data request, the requested data having been provided with an indication of authenticity by the next-hop node, and verify the authenticity of the received data using the acquired session key, wherein the received requested data is considered authenticated.

This object is attained in a third aspect of the invention by a method of a service chain node configured to forward a received data request to a next-hop node of the service chain. The method comprises acquiring secret second seed data, receiving the data request to be forwarded, first seed data and an indication of the service chain to be traversed, generating a session key using the received first seed data and the acquired secret second seed data, and forwarding the data request, the indication of the service chain to be traversed and the first seed data to the next-hop node. The method further comprises receiving, in response to the forwarded data request, the requested data having been provided with an indication of authenticity by the next-hop node, verifying the authenticity of the received data using the generated session key, providing the requested data with an indication of authenticity using the generated session key, and forwarding the requested data and said indication of authenticity to the node from which the data request was received.

This object is attained in a fourth aspect of the invention by a service chain node configured to forward a received data request to a next-hop node of the service chain, the service chain node comprising a processing unit and a memory, said memory containing instructions executable by said processing unit, whereby the service chain node is operative to acquire secret second seed data, receive the data request to be forwarded, first seed data and an indication of the service chain to be traversed, generate a session key using the received first seed data and the acquired secret second seed data, and forward the data request, the indication of the service chain to be traversed and the first seed data to the next-hop node. The service chain node is further operative to receive, in response to the forwarded data request, the requested data having been provided with an indication of authenticity by the next-hop node, verify the authenticity of the received data using the generated session key, provide the requested data with an indication of authenticity using the generated session key, and forward the requested data and said indication of authenticity to the node from which the data request was received.

This object is attained in a fifth aspect of the invention by a method of a destination node of a service chain of responding to a data request from a communication device, the data request having passed at least one intermediate node of the service chain on its way to the destination network node. The method comprises acquiring secret second seed data, receiving the data request comprising first seed data, generating a session key using the received first seed data and the acquired secret second seed data, providing the requested data with an indication of authenticity using the generated session key, and sending the requested data and said indication of authenticity to the service chain node from which the data request was received.

This object is attained in a sixth aspect of the invention by a destination node of a service chain configured to respond to a data request from a communication device, the data request having passed at least one intermediate node of the service chain on its way to the destination network node, the destination node comprising a processing unit and a memory, said memory containing instructions executable by said processing unit, whereby the destination node is operative to acquire secret second seed data, receive the data request comprising first seed data, generate a session key using the received first seed data and the acquired secret second seed data, provide the requested data with an indication of authenticity using the generated session key, and send the requested data and said indication of authenticity to the service chain node from which the data request was received.

Assuming that a communication device (CD) such as for instance a smart phone requests data of data source (DS) via two intermediate service nodes (SN) in a service chain, SN1 and SN2.

Before sending a request for data in an upstream direction to the next-hop service node SN1 in the chain, the CD acquires 1) a secret session key $K_r$ configured to subsequently verify authenticity of the requested data and 2) first seed data seed to be used by the service nodes SN1 and SN2 and the destination node DS (also effectively being a service node in the service chain) to generate the session key.

Further, each one of the service chain nodes SN1, SN2 and the DS acquires secret second seed data seed2.

The session key $K_r$, the first seed data seed and the second seed data seed2 may in an embodiment be acquired by the respective node from a trusted network supervision node such as a name resolution function in the form of e.g. a Domain Name System (DNS).

Upon transmitting the data request in to the next-hop service node SN1, the CD includes in the data request an indication of the service chain to be traversed, for instance an identifier of each node (such as an address) in the service chain, in this particular exemplifying embodiment SN1, SN2 and DS, and the first seed data seed1.

When receiving the data request, the next-hop service node SN1 generates the session key $K_r$ using the received first seed data seed and the acquired secret second seed data seed2.

Advantageously, the secret second seed data seed2 is valid for all requests and must only be transmitted once, while the first seed data seed is specific for each request can be transmitted in the clear.

In a very simple and straightforward implementation—since the second seed data seed2 is secret—it would be possible to more or less add the first seed data seed and the second seed data seed2 to create the session key $K_r$; only a node holding the secret second seed can recreate the session key $K_r$.

Thereafter, the data request, the indication of the service chains, and the first seed data seed1 is forwarded to further next-hop node SN2.

Correspondingly, the next-hop service node SN2 generates the session key $K_r$ using the approach of the other nodes in the service chain and forwards the request to the data source DS, which in its turn generates the session key $K_r$ before sending the requested data in a downstream direction towards the requesting CD.

By providing the requested data with an indication of authenticity using the generated session key $K_r$ before sending the data downstream, each node SN1 and SN2 in the service chain, as well as CD, can verify the authenticity of the received data.

Hence, each node in the chain will verify the authenticity of the received data using the session key $K_r$ before forwarding the data in a downstream direction towards the CD.

Advantageously, the CD 100 will finally receive the initially requested data (and any services/added data provided by the intermediate nodes SN1 and SN2 in the service chain), and uses the session key $K_r$ to verify the received data. In an embodiment, the CD includes a request identifier in the data request.

In a further embodiment, the CD acquires the secret session key and the first seed data by performing authentication towards a trusted key generation node, indicating the service chain to be traversed to the trusted key generation node, and receiving the secret session key and the first seed data from the trusted key generation node, wherein at least the secret session key is encrypted with a key for which the CD holds a corresponding decryption key.

In another embodiment, the session key is generated by the SN1, SN2 and DS by processing a combination of the first seed data and the second seed data in a hash function.

In a further embodiment, the data request further comprising an index number indicating how many times the hash function should be applied to the combination of the first seed data and the second seed data.

In still an embodiment, the indication of authenticity is provided by creating a message authentication code by signing the data with the session key and transmitting the message authentication code with the data, wherein a receiver of the message authentication code and the data verifies the message authentication code using the generated session key.

In yet an embodiment, the indication of authenticity is provided by encrypting the requested data with the session key, wherein a receiver of the encrypted data verifies the data by decrypting the encrypted data using the generated session key.

In still a further embodiment, an identifier of the node transmitting data is included with the requested data being transmitted to the node from which the request came.

In an embodiment, an identifier of the request is included with the requested data being transmitted to the node from which the request came.

In another embodiment, the at least one intermediate node SN1, SN2 provides a service in response to the received data request and/or adds further data before transmitting the requested data to the node from which the data request was received.

In still another embodiment, the acquiring of the secret second seed data comprises performing authentication towards a trusted key generation node, and receiving the secret second seed data from the trusted key generation node, wherein the secret session key is encrypted with a key for which the intermediate node and the destination node holds a corresponding decryption key.

In yet an embodiment, the receiving of the secret second seed data further comprises receiving the function used to subsequently generate the session key, or information from which the function can be derived.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Embodiments will be described in the following with reference to service chaining in an ICN-type network. However, the embodiments may be implemented in any appropriate service chaining architecture, such as Internet Protocol (IP) networks where service requests can be forwarded hop-by-hop between service nodes using e.g. Hypertext Transfer Protocol (HTIP).

Figure 1:
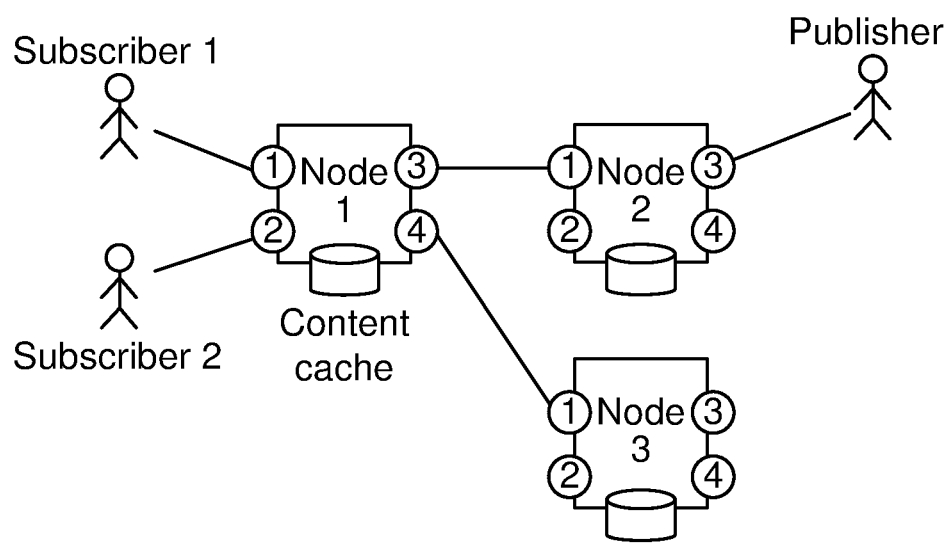
FIG. 1 illustrates a general operating principle of prior art ICN content request and delivery.

FIG. 1 illustrates a general operating principle of prior art ICN content request and delivery. This operating principle assumes that a link used in one direction—e.g. between ICN Node 1 and ICN Node 2 essentially being switches equipped with large caches for transporting content—to send content requests from subscribers is also used in the other direction to send the corresponding content back via ICN Node 1 and ICN Node 2 from a content provider (i.e. a "publisher") to the subscribers. All links in ICN are therefore assumed to allow for bi-directional communication. A request in ICN terminology is commonly referred to as an "interest" and comprises the unique name of the content object to be fetched (commonly referred to as "data").

Each ICN node may thus be viewed upon as a service node in a service chain providing a particular service to the traffic flow passing over the node, even though further service nodes can be interspersed between the ICN nodes.

Multicast support is a feature in ICN when transporting a particular content object from a content provider to various subscribers/end users whom have requested content from that particular content provider. With reference to FIG. 1, if both Subscriber 1 and 2 request the same content, e.g. a live video stream, both subscribers will submit a request/interest to ICN Node 1. However, ICN Node 1 will only forward a single request to ICN Node 2 for that video stream, and ICN Node 2 will as a result forward the single request towards the content provider. This is referred to as "interest aggregation". The content provider will thereafter return a single copy of the requested live stream to ICN Node 2. Likewise, ICN Node 2 will only send one copy of the live stream over its link to ICN Node 1. ICN Node 1 will then replicate the content of the video stream and send it to both Subscriber 1 and 2.

To the contrary, should ICN Node 1 already have the requested content in its cache, it will deliver the content to the requesting subscriber(s) without submitting any further upstream request to ICN Node 2.

The routing of interests is helped by the name of a requested piece of content being a structured name (similar to domain names, but with richer syntax). Routing ICN nodes maintain a Forwarding Information Base (FIB) indicating where, i.e. across which interface, the interest message including name or name prefix should be forwarded to.

The routing ICN nodes along the path of the travelling interest message keep a record of the interest messages they have forwarded (i.e. the interface(s) that the interest came from and the content object it was naming) in their Pending Interest Table (PIT), in order to be able to route content objects to the requester of the objects, commonly referred to as "breadcrumb routing". Further, each ICN node comprises a Content Store (CS) shown as a content cache in FIG. 1, which is used to cache a copy of the named content objects. Future interests for the same object can then be served from the cache without forwarding the interest to further ICN node(s).

As can be concluded, when the interest message reaches an ICN node having a copy of the content object, the content object is propagated backwards along the path the interest message took. The backward path is learned from the entries the interest message left in the PITs of the ICN nodes along the path. If there were multiple interests arriving at an ICN node for a content object address by a particular name, the content object is replicated towards each respective interface/direction the interest messages came from. After forwarding a content object matching a pending interest, the ICN nodes delete the corresponding entry in the PIT. When the original endpoint(s) generating the interest message(s) receive the content object, the transaction is considered finalized.

Advantageously, ICN technology provides for an efficient, scalable and flexible approach of delivering data to an end-user.

A problem with the existing ICN technology or any service chaining technology) is that an attacker can eavesdrop on the network and inject data messages. For example, with reference to FIG. 1, Subscriber 1 requests a service from ICN Node 1, and when sending the request everything is in plaintext. An attacker could eavesdrop on the request and inject a malicious response for the data sent back to Subscriber 1 from ICN Node 1, and Subscriber 1 cannot verify that the response indeed is an authentic response.

Figure 2:
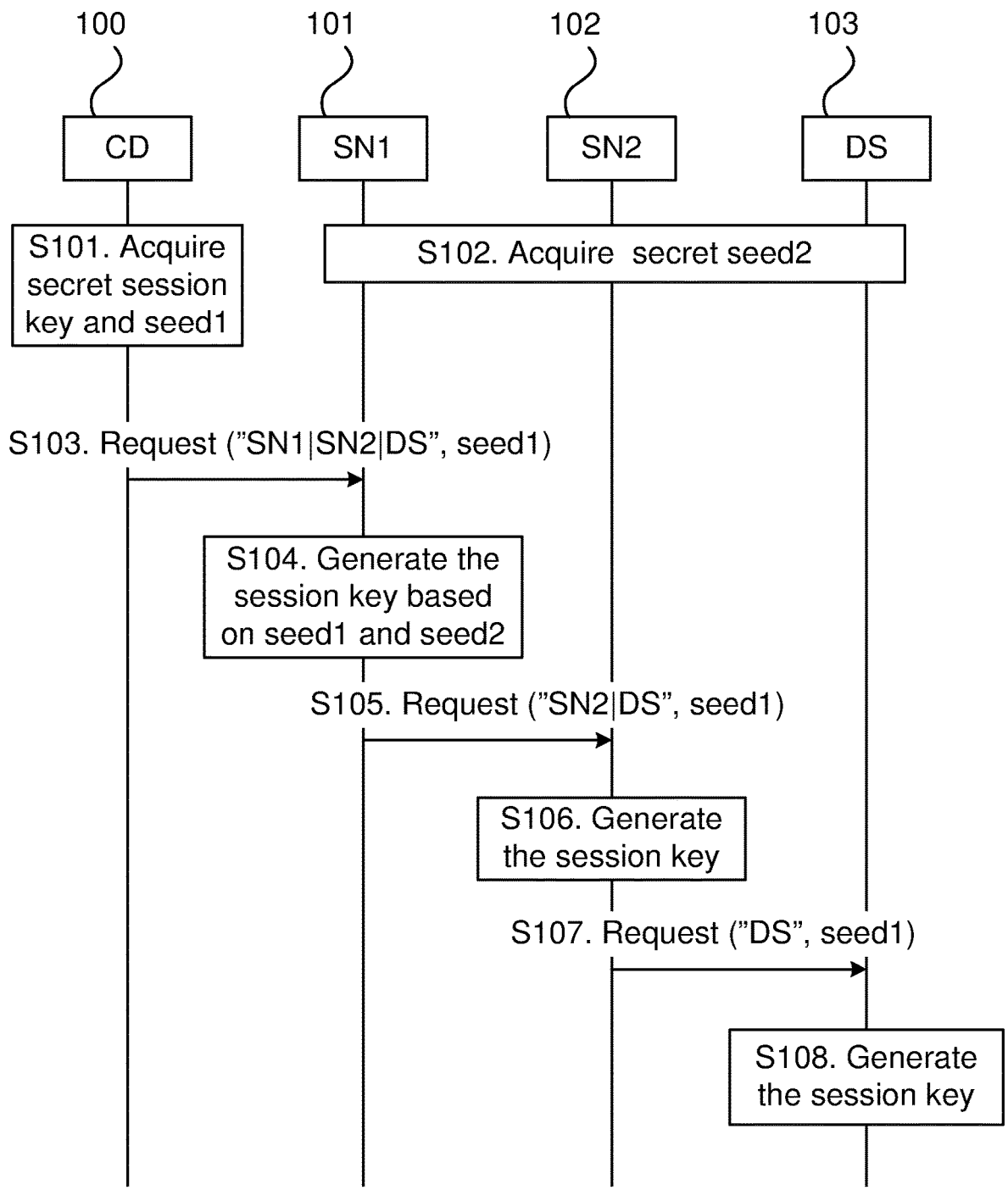
FIG. 2 shows a timing diagram illustrating an embodiment of requesting and delivering data via a service chain.
Figure 3:
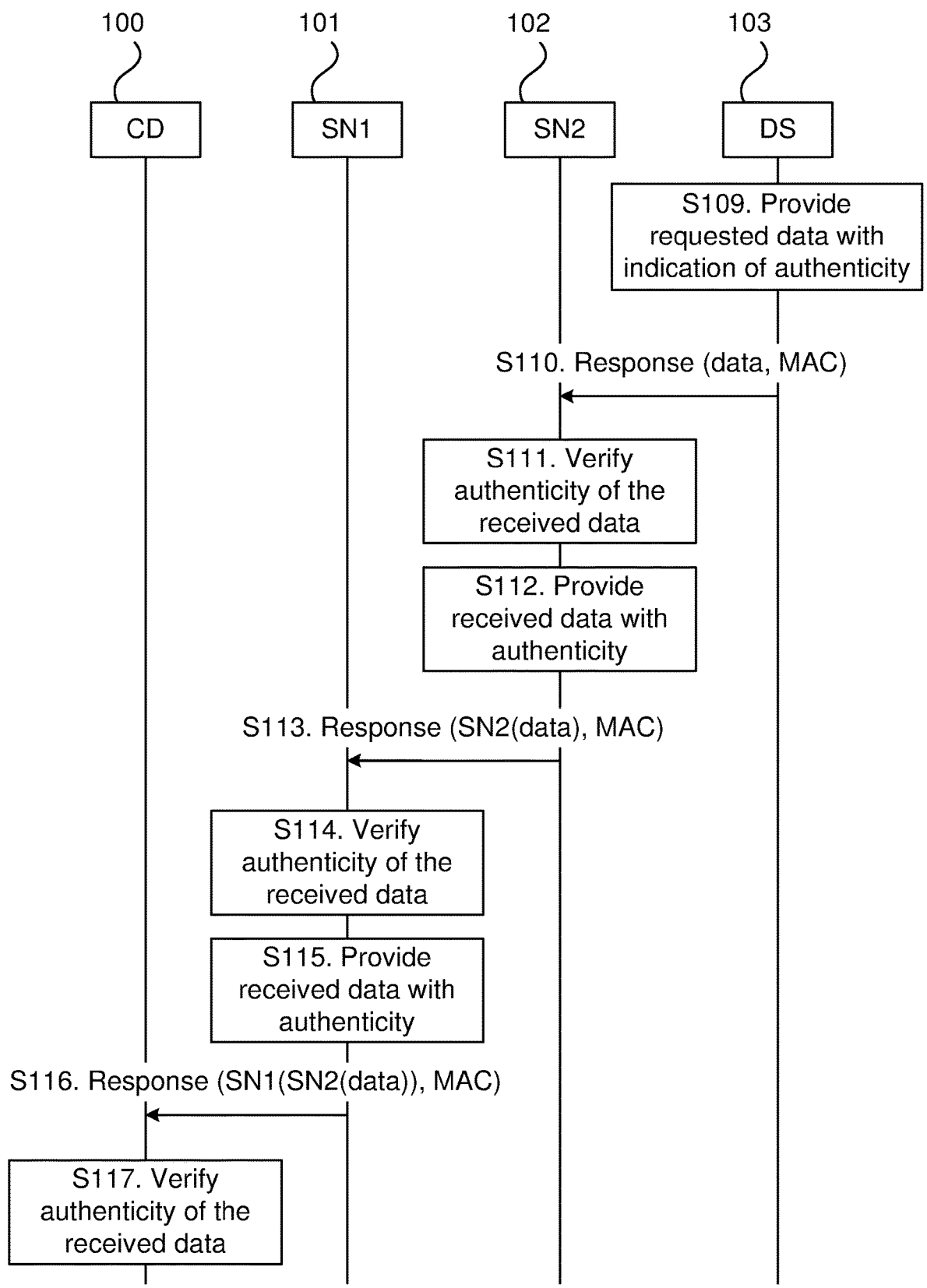
FIG. 3 shows a timing diagram being a continuation of that in FIG. 2, illustrating an embodiment of requesting and delivering data via a service chain.

FIGS. 2 and 3 show timing diagrams illustrating embodiments of requesting and delivering data via a service chain while rendering manipulation of data transported over the service chain difficult for an attacker.

Assuming that a communication device (CD) 100 such as for instance a smart phone requests data of data source (DS) 103 via two intermediate service nodes (SN) in a service chain, SN1 101 and SN2 102, where SN1 and SN2 for instance may be ICN nodes while DS 103 is a publisher/content provider.

Before sending a request for data in an upstream direction to the next-hop service node SN1 101, the CD 100 acquires 1) a secret session key configured to subsequently verify authenticity of the requested data and 2) first seed data seed1 to be used by the service nodes SN1 101 and SN2 102 and the destination node DS (also effectively being a service node in the service chain) to generate the session key.

Further, each one of the service chain nodes SN1 101, SN2 102 and DS 103 acquires secret second seed data seed2 in step S102.

The session key $K_r$, the first seed data seed1 and the second seed data seed2 may in an embodiment, as will be discussed in more detail in the following, be acquired by the respective node from a trusted network supervision node such as a name resolution function in the form of e.g. a Domain Name System (DNS).

Upon transmitting the data request in step S103 to the next-hop upstream service node SN1 101, the CD 100 includes in the data request an identifier of each node, e.g. an address, in the service chain via which the request should be transmitted, in this particular exemplifying embodiment SN1, SN2 and DS, and the first seed data seed1.

If the request does not have an ID associated with it, each node can generate an ID for each request that it receives and forwards. In that case, each node may keep a mapping on the incoming interest ID and outgoing interest ID.

When receiving the data request to be forwarded, the first seed data seed1 and an identifier of each remaining node in the service chain that the data request should be transmitted to in step S103, the first service node SN1 101 generates the session key $K_r$ using the received first seed data and the acquired secret second seed data in step S104.

Advantageously, the secret second seed data seed2 is valid for all requests and must only be transmitted once, while the first seed data seed1 is specific for each request can be transmitted in the clear.

Many options may be envisaged for generating the session key $K_r$, for instance a hash function H may be used for processing the first seed data seed1 and the second seed data seed2:

$$K_r = H(\text{seed1}, \text{seed2}) \quad (1)$$

In a very simple and straightforward implementation—since the second seed data seed2 is secret—it would be possible to more or less add the first seed and the second seed to create the session key; only a node holding the secret second seed can recreate the session key $K_r$.

Thereafter, the data request and the identifier of each remaining node in the service chain that the data request should be transmitted to, in this case SN2 and D2, and the first seed data seed1 is forwarded to the next-hop node SN2 102.

Correspondingly, the next-hop service node SN2 102 generates the session key $K_r$ in step S106 using the approach of the other nodes in the service chain (for instance that defined by equation (1)), and forwards the request to the data source DS 103 in step S107, which in its turn generates the session key $K_r$ in step S108 before sending the requested data in a downstream direction towards the requesting CD 100.

FIG. 3 shows a timing diagram being a continuation of that shown in FIG. 2 illustrating delivery of the requested data from the data source DS 103 to the requesting communication device CD 100 via the intermediate service chain nodes SN2 102 and SN1 101.

After having received the data request in step S107 and generated the session key $K_r$ in step S108, the DS 103 provides the requested data with an indication of authenticity using the generated session key $K_r$ in step S109.

Similarly to the method used for generating the session key $K_r$, many options may be envisaged for providing the indication of authenticity. For instance, a Message Authentication Code (MAC) may be computed by processing the requested data in a hash function using the session key $K_r$:

$$\text{MAC} = H_{K_r}(\text{data}) \quad (2)$$

Many alternatives can be envisaged, for instance encrypting the data using the symmetric key $K_r$, denoted $E_{K_r}(\text{data})$, which not only provides authenticity but also confidentiality to the data.

Thereafter, in step S110, DS 103 sends the data and the indication of authenticity, i.e. the computed MAC, to the immediately preceding node SN2 102 from which the request came.

Upon receiving the requested data having been provided with an indication of authenticity in the form of the MAC in step S110 from the DS 103, the SN2 102 verifies authenticity of the received data using the generated session key in step S111. In this particular exemplifying embodiment, the SN2 102 processes the received data in the hash function of equation (2) with the session key $K_r$, and if the received MAC and the computed MAC are the same, the authenticity of the received data is verified.

The SN2 102 will in its turn provide the data to be forwarded with an indication of authenticity in step S112. It should be noted that the SN2 102 may provide a service to the data to be sent downstream towards the CD 100, or even add further data to received data to be sent downstream. It can also be envisaged, for instance in case of an ICN architecture, that SN2 simply forwards any received data without providing a service or adding any further data. The data sent from the SN2 102 is denoted SN2(data).

Hence, the SN2 102 computes the MAC according to equation (2) for the data denoted SN2(data) and sends the data to the next-hop downstream node SN1 101 from which the data request came in step S113.

Correspondingly, the SN1 101 will verify the received data by computing the MAC=$H_{K_r}$(SN2(data)) and comparing the computed MAC with the received MAC in step S114. Again, the SN1 101 may forward the received data or provide a service and/or add further data to the data received from the upstream next-hop node SN2 102, the forwarded data being denoted SN1(SN2(data)).

The SN1 101 computes a MAC in line with equation (2): MAC=$H_{K_r}$(SN1(SN2(data))) and sends the computed MAC to the requesting CD 100 in step S116.

Finally, the CD 100 uses the session key $K_r$ initially acquired in step S101 to verify the received MAC using the received data in line with equation (2).

Advantageously, the CD 100 has received the initially requested data (and any services/added data provided by the intermediate nodes SN1 101 and SN2 102 in the service chain), and uses the session key $K_r$ acquired in step S101 to verify the received data; that is, the CD 100 computes the MAC=$H_{K_r}$(SN1(SN2(data))) and concludes that the computed MAC equals the received MAC (if not, the process is aborted). If so, the received data is authentic and the CD 100 can finally render the received data (or alternatively SN1 (SN2(data)) if both the intermediate service chain nodes have contributed with any service or added data).

As can be concluded from the above description with reference to FIGS. 2 and 3, each node in the service chain, as well as the requesting device 100 can advantageously be ensured as regards the validity of any received data.

Note that after having verified the received data and generated the new MAC, a service node can discard the session key.

In an embodiment, the data request transmitted in step S101 may be complemented with a request ID, which further is included in any upstream or downstream inter-node transmission of FIGS. 2 and 3.

In still an embodiment, in downstream transmission, each node sending data in a downstream direction further includes a node ID such that the receiver of the data can compare the ID with the corresponding ID included in the upstream data request.

In a further embodiment, any one or both of the request ID and the node ID may be included in the MAC generated by each node transmitting data in the downstream direction, thereby resulting in:

MAC=$H_{K_r}$(data,request ID,node ID)

In still a further embodiment, in case of using the key generation algorithm of equation (1), an index is included resulting in:

$$K_r = H^{index}(seed1, seed2) \quad (3)$$

where the index indicates how many times the hash function has to be applied, for example, $H^2$=H(H( )). It is noted that a number of combination of seed1 and seed2 to be hashed can be envisaged, such as seed 1×seed 2, seed1+seed2, seed1 XOR seed2, seed1||seed2, etc.

Figure 4:
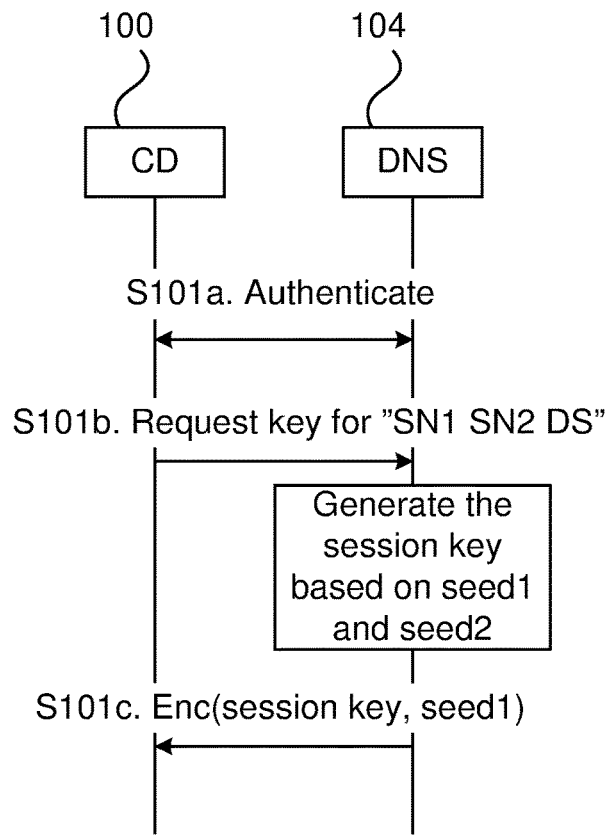
FIG. 4 shows a signalling diagram illustrating an embodiment where a communication device acquires a secret session key and first seed data.

FIG. 4 shows a signalling diagram illustrating an embodiment where the CD 100 acquires the secret session key $K_r$ and the first seed data seed1 from a DNS 104.

In a first step S101a, the CD 100 engages in an authentication process with the DNS using e.g. an asymmetric key pair with which the CD 100 is preconfigured.

Upon successful authentication, the CD 100 sends in step S101b an indication of the service chain that is to be traversed, in this particular example "SN1|SN2|DS". If the CD 100 does not know the actual destination addresses of the nodes to be traversed in the service chain, the DNS 104 may provide the CD 100 with the addresses of the nodes in the service chain to be traversed. It may be envisaged the CD 100 indicates a list of requested services, and the DNS 104 replies with the addresses of the nodes in the service chain to be traversed.

Here, a number of options may be envisaged for the indication of the service chain to be traversed; for instance, the CD 100 may provide the DNS 104 with an identifier for the next-hop node (SN1), or a list of requested services in which case the DNS 104 may return.

Further, in case the embodiment is implemented in ICN—which allows for name-based routing, and can route both on object names and service names—it is sufficient if the CD 100 specifies in its request the names of the services in the service chain.

Then, each node in the service chain can use the ICN routing mechanism to find the next-hop node. Alternatively, the first node in the chain can utilize a name resolution system to resolve all service names in the service chain specified in the request into IP addresses, and include these IP addresses in the request as a source route. Thereafter, in step S101c, the CD 100 received from the DNS 104 at least the session key $K_r$, the first seed data seed1 and optionally the index and the request ID and/or an address of the next-hop node SN1.

In the message returned to the CD 100, at least the session key $K_r$ must be encrypted by the public key of the CD 100 of the previously mentioned asymmetric key pair. Further, the session key $K_r$ will be generated by the DNS 104 in the manner discussed hereinabove. That is, the DNS 104 must generate the session key $K_r$ exactly like the service chain nodes SN1 101, SN2 102 and the DS 103.

Note that an alternative to authenticating the CD1 100 with the DNS 104 is to use a proxy. The proxy is trusted proxy and has a secure trusted connection to the DNS 104, and the CD 100 can communicate with the proxy using regular HTP Secure.

Figure 5:
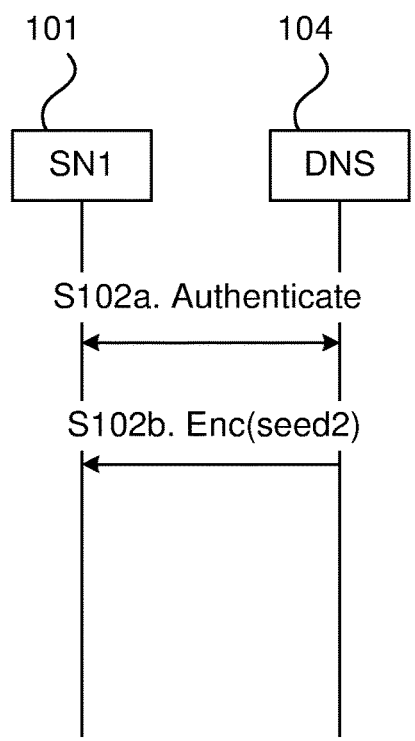
FIG. 5 shows a signalling diagram illustrating an embodiment where a service node acquires secret second seed data.

FIG. 5 shows a signalling diagram illustrating an embodiment where a service node, in this case SN1 101, acquires the secret second seed data seed2 from a DNS 104. With reference to FIG. 2, the SN2 102c and the DS 103 need to perform the same procedure.

In a first step S102a, the SN1 101 engages in an authentication process with the DNS 104 using e.g. an asymmetric key pair with which the SN1 101 is preconfigured.

Upon successful authentication, the SN1 101 receives the secret second seed seed2 from DNS 104 in step S102b.

Optionally, the SN1 101 may receive the function to be used for subsequently generating the session key (e.g. according to equation (1) or (2)), unless the nodes of the service chain are preconfigured with the function, that is; they "know" the function from the outset. An advantage in providing the service nodes with the function (or a function name from which the function may be derived, such as e.g. MD5, SHA1, SHA2) is that it provides for greater flexibility; different functions can be used in different implementations.

In the message returned to the SN1 101, at least the secret second seed seed2 must be encrypted by the public key of the SN1 101 of the previously mentioned asymmetric key pair.

Figure 6:
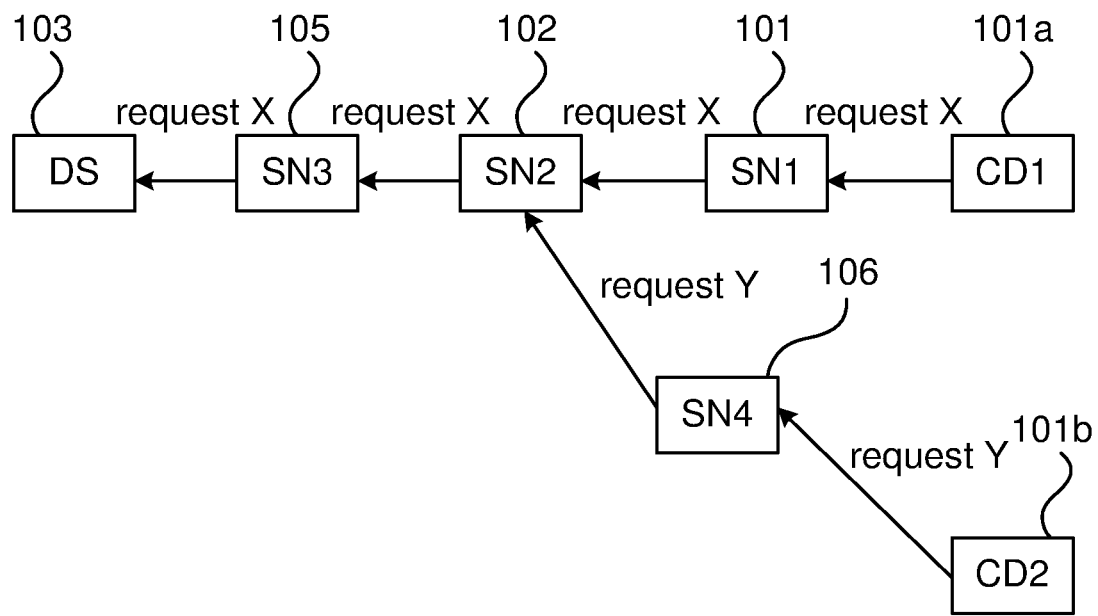
FIG. 6 illustrates interest aggregation in ICN.

FIG. 6 illustrates a situation where the previously mentioned ICN concept referred to as interest aggregation comes into play.

Assuming that CD1 101a sends a request X for data towards the DS 103 via SN1 101, SN2 102 and SN3 104; and that CD2 102a sends a request Y for the same data towards the DS 103 via SN4 106, SN2 102 and SN3 104.

If request X arrives first at the SN2 102 and is transmitted upstream towards the DS 103 via the SN3 105, the SN2 102 will not forward the request Y received from the CD2 101b, in order to comply with the interest aggregation property of an ICN network.

However, when the requested data arrives at the SN2 102 from the SN3 105, a MAC will be created for the CD1 101a and the CD2 101b using the respective session key, and the data and the MAC intended for the CD 101a will be sent to the SN1 101, while the data and the MAC intended for the CD2 101b will be sent to the SN4 106, as has been described in detail hereinabove.

As is understood, the communication device 100, the service nodes 101, 102 and the destination node 103 typically comprise one or more processing units executing an appropriate computer program in order to accomplish functions as described hereinabove.

Figure 7:
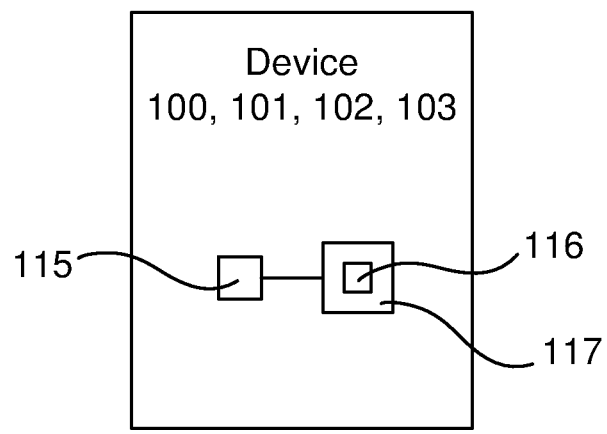
FIG. 7 illustrates a device according to an embodiment.

FIG. 7 illustrates a device, such as the communication device 100, the service nodes 101, 102 or the destination node 103, according to an embodiment. The steps of the methods performed by the device are in practice performed by a processing unit 115 embodied in the form of one or more microprocessors arranged to execute a computer program 116 downloaded to a suitable storage volatile medium 117 associated with the microprocessor, such as a Random Access Memory (RAM), or a non-volatile storage medium such as a Flash memory or a hard disk drive. The processing unit 115 is arranged to cause the device to carry out the methods according to embodiments when the appropriate computer program 116 comprising computer-executable instructions is downloaded to the storage medium 117 and executed by the processing unit 115. The storage medium 117 may also be a computer program product comprising the computer program 116. Alternatively, the computer program 116 may be transferred to the storage medium 117 by means of a suitable computer program product, such as a Digital Versatile Disc (DVD) or a memory stick. As a further alternative, the computer program 116 may be downloaded to the storage medium 117 over a network. The processing unit 115 may alternatively be embodied in the form of a digital signal processor (DSP), an application specific integrated circuit (ASIC), a field-programmable gate array (FPGA), a complex programmable logic device (CPLD), etc.

Figure 8:
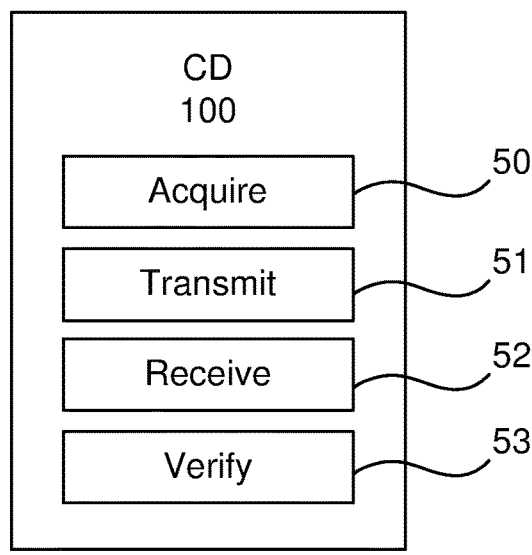
FIG. 8 illustrates a communication device according to an embodiment.

FIG. 8 illustrates a communication device (CD) 100 according to an embodiment. The CD o100 comprises acquiring means 50 adapted to acquire a secret session key configured to subsequently verify authenticity of the requested data and first seed data to be used by at least one intermediate node and a destination node to generate the session key, transmitting means 51 adapted to transmit the data request, an indication of a service chain to be traversed, and the first seed data to a next-hop node in the service chain, receiving means 52 adapted to receive, in response to the forwarded data request, the requested data having been provided with an indication of authenticity by the next-hop node, and verifying means 53 adapted to verify the authenticity of the received data using the acquired session key, wherein the received requested data is considered authenticated.

Figure 9:
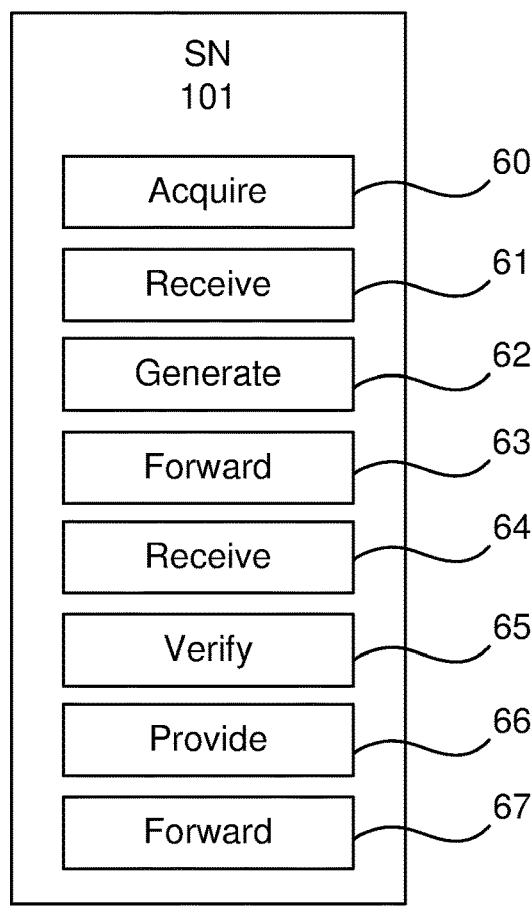
FIG. 9 illustrates a service node according to an embodiment.

FIG. 9 illustrates a service node (SN) 101 according to an embodiment. The SN 101 comprises acquiring means 60 adapted to acquire secret second seed data, receiving means 61 adapted to receive a data request to be forwarded, first seed data and an indication of a service chain to be traversed, generating means 62 adapted to generate a session key using the received first seed data and the acquired secret second seed data, and forwarding means 63 adapted to forward the data request, the indication of the service chain to be traversed, and the first seed data to the next-hop node. The SN 101 further comprises receiving means 64 adapted to receive, in response to the forwarded data request, the requested data having been provided with an indication of authenticity by the next-hop node, verifying means 65 adapted to verify the authenticity of the received data using the generated session key, providing means 66 adapted to provide the requested data with an indication of authenticity using the generated session key, and forwarding means 67 adapted to forward the requested data and said indication of authenticity to the node from which the data request was received.

Figure 10:
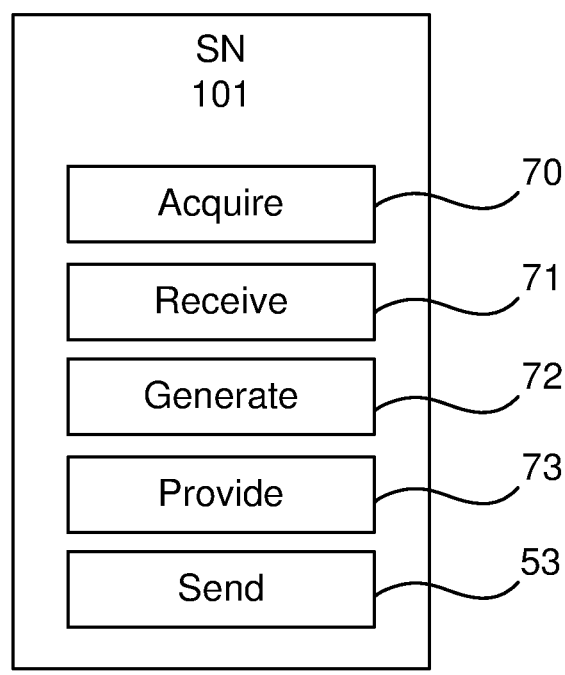
FIG. 10 illustrates a destination node according to an embodiment.

FIG. 10 illustrates a destination node (DS) 103 according to an embodiment. The DS 103 comprises acquiring means 70 adapted to acquire secret second seed data, receiving means 71 adapted to receive the data request comprising first seed data, generating means 72 adapted to generate a session key using the received first seed data and the acquired secret second seed data, providing means 73 adapted to provide the requested data with an indication of authenticity using the generated session key, and sending means 74 adapted to send the requested data and said indication of authenticity to the service chain node from which the data request was received.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method of a communication device of requesting data of a destination network node via at least one intermediate node in a service chain, comprising:
    acquiring a secret session key configured to subsequently verify authenticity of requested data and first seed data to be used by the at least one intermediate node and the destination node to generate the secret session key;
    transmitting a data request, an indication of the service chain to be traversed, and the first seed data to a next-hop node in the service chain;
    receiving, in response to the transmitted data request, the requested data having been provided with an indication of authenticity by the next-hop node; and
    verifying the authenticity of the received requested data using the acquired secret session key, wherein the received requested data is considered authenticated when verified.

2. The method of claim 1, wherein a request identifier is comprised in the data request.

3. The method of claim 1, wherein the acquiring of the secret session key and the first seed data comprising:
    performing authentication towards a trusted key generation node;
    indicating the service chain to be traversed to the trusted key generation node; and
    receiving the secret session key and the first seed data from the trusted key generation node, wherein at least the secret session key is encrypted with a key for which the communication device holds a corresponding decryption key.

4. A method of a service chain node configured to forward a received data request to a next-hop node of the service chain, comprising:
    acquiring a secret second seed data;
    receiving the data request to be forwarded, first seed data and an indication of the service chain to be traversed;
    generating a session key using the received first seed data and the acquired secret second seed data;

forwarding the data request, the indication of the service chain to be traversed and the first seed data to the next-hop node;

receiving, in response to the forwarded data request, the requested data having been provided with an indication of authenticity by the next-hop node;

verifying the authenticity of the received data using the generated session key;

providing the requested data with an indication of authenticity using the generated session key; and forwarding the requested data and said indication of authenticity to a node from which the data request was received.

5. The method of claim 4, wherein the session key being generated by processing a combination of the first seed data and the second seed data in a hash function.

6. The method of claim 5, the data request further comprising an index number indicating how many times the hash function is to be applied to the combination of the first seed data and the second seed data.

7. The method of claim 4, wherein the indication of authenticity being provided by creating a message authentication code by signing the requested data with the session key and transmitting the message authentication code with the requested data, and wherein a receiver of the message authentication code and the requested data verifies the message authentication code using the generated session key.

8. The method of claim 4, wherein the indication of authenticity being provided by encrypting the requested data with the session key, wherein a receiver of the encrypted data verifies the requested data by decrypting the encrypted data using the generated session key.

9. The method of claim 4, wherein an identifier of a node transmitting data is included with the requested data being transmitted to a node from which the request came.

10. The method of claim 4, wherein an identifier of the request is included with the requested data being transmitted to a node from which the request came.

11. The method according to claim 4, wherein at least one intermediate node provides a service in response to the received data request, adds further data, or both provides the service in response to the received data request and adds further data, before transmitting the requested data to a node from which the data request was received.

12. The method of claim 4, wherein the acquiring of the secret second seed data comprising:

performing authentication towards a trusted key generation node; and receiving the secret second seed data from the trusted key generation node, wherein the session key is encrypted with a key for which the service chain node and a destination node holds a corresponding decryption key, the destination node being a destination of the service chain.

13. The method of claim 12, wherein the receiving of the secret second seed data further comprising:

receiving the function used to subsequently generate the session key, or information from which the function can be derived.

14. A communication device configured to request data of a destination network node via at least one intermediate node in a service chain, the communication device comprising:

a processing device; and a memory containing instructions which, when executed by said processing device, cause the communication device to perform operations to:

acquire a secret session key configured to subsequently verify authenticity of requested data and first seed data to be used by the at least one intermediate node and the destination node to generate the secret session key;

transmit a data request, an indication of the service chain to be traversed, and the first seed data to a next-hop node in the service chain;

receive, in response to the transmitted data request, the requested data having been provided with an indication of authenticity by the next-hop node; and verify the authenticity of the received requested data using the acquired secret session key, wherein the received requested data is considered authenticated when verified.

15. The communication device of claim 14, wherein a request identifier is comprised in the data request.

16. The communication device of claim 14, further being operative to, when acquiring the secret session key and the first seed data:

perform authentication towards a trusted key generation node;

indicate the service chain to be traversed to the trusted key generation node; and receive the secret session key and the first seed data from the trusted key generation node, wherein at least the secret session key is encrypted with a key for which the communication device holds a corresponding decryption key.

17. A destination node of a service chain configured to respond to a data request from a communication device, the data request having passed at least one intermediate node of the service chain on its way to the destination node, the destination node comprising:

a processing device; and a memory containing instructions which, when executed by said processing device, cause the destination node to perform operations to:

acquire a secret second seed data;

receive the data request comprising a first seed data;

generate a session key using the received first seed data and the acquired secret second seed data;

provide requested data with an indication of authenticity using the generated session key; and sending the requested data and said indication of authenticity to an intermediate node from which the data request was received.

18. The destination node of claim 17, further being operative to generate the session key by processing a combination of the first seed data and the second seed data in a hash function.

19. The destination node of claim 18, wherein the data request further comprising an index number to indicate how many times the hash function is to be applied to the combination of the first seed data and the second seed data.

20. The destination node of claim 17, further being operative to provide the indication of authenticity by creating a message authentication code by signing the requested data with the session key and to transmit the message authentication code with the requested data, and wherein a receiver of the message authentication code and the requested data verifies the message authentication code using the generated session key.

21. The destination node of claim 17, further being operative to provide the indication of authenticity by encrypting the requested data with the session key, wherein a receiver of the encrypted data verifies the requested data by decrypting the encrypted data using the generated session key.

22. The destination node of claim 17, further being operative to include an identifier of a node transmitting data with the requested data being transmitted to a node from which the request came.

23. The destination node of claim 17, wherein an identifier of the request is included with the requested data being transmitted to a node from which the request came.

24. The destination node of claim 17, wherein the at least one intermediate node provides a service in response to the received data request, adds further data, or both provides the service in response to the received data request and adds further data, before transmitting the requested data to a node from which the data request was received.

25. The destination node of claim 17, further being operative to, when acquiring the secret second seed data:
   perform authentication towards a trusted key generation node; and
   receive the second seed data from the trusted key generation node, wherein
      the session key is encrypted with a key for which the at least one intermediate node and the destination node holds a corresponding decryption key.

26. The destination node of claim 25, further being operative to, when receiving the secret second seed data further:
   receive the function used to subsequently generate the session key, or information from which the function can be derived.

* * * * *